UNITED STATES PATENT OFFICE.

LUDWIG H. REUTER, OF BERKELEY, CALIFORNIA.

SURGICAL BANDAGE OR SPLINT.

1,107,357. Specification of Letters Patent. Patented Aug. 18, 1914.

No Drawing. Application filed April 18, 1908. Serial No. 427,913.

*To all whom it may concern:*

Be it known that I, LUDWIG H. REUTER, a citizen of the United States, residing at Berkeley, in the county of Alameda and State of California, have invented a new and useful Surgical Bandage or Splint, of which the following is a specification.

This invention relates to surgical bandages or splints. The most common materials used for this purpose, such as plaster of Paris and the like, are not sufficiently pervious to X-rays; therefore, when it is necessary to examine the broken or diseased bones to which such bandages or splints are applied, it is necessary to remove the dressing and leave the part to be examined unprotected during the examination. This, obviously, is a great disadvantage.

The principal objects of this invention are to provide a composition which can be applied in a simple and convenient manner with water only, so as to produce bandages and splints that will be of light weight and great strength and have water resistant qualities so as effectively to protect a fracture or the like, and that can be transported without danger of deterioration of the ingredients, and yet allow the pasage of the X-rays.

Further objects and advantages of the invention will appear hereinafter.

I do not propose necessarily to do away entirely with the ordinary plaster of Paris splints and bandages, but this invention may be employed in connection with the same. However, if desired my improved composition may be used to the exclusion of the plaster of Paris or other splint in common use.

In order to provide for accomplishing the above mentioned results, I employ a mixture of oxid of magnesium, preferably in the form of calcined magnesite, with a soluble magnesium salt capable of combining with the magnesium oxid. In regard to calcined magnesite I wish to state, that I mean by that term magnesite rock which has been calcined and which if not completely calcined may contain more or less of carbonate of magnesium, and the impurities met with usually in the rock, viz. aluminum oxid, iron oxid, some silica, lime, etc.

The anhydrous sulfate of magnesium may be used as it keeps very well without decomposition. I find, however, that it is unnecessary to use the anhydrous sulfate as the salt containing 6, 5 or 4 molecules of water of crystallization or less gives equally satisfactory results. In other words, it is unnecessary to go to the trouble of driving off all the water of crystallization from the normal sulfate or magnesium to obtain the anhydrous salt, but the salt containing any number of molecules of water of crystallization from 1 to 6 may be employed with a corresponding decrease in the cost of obtaining it on a commercial scale. In any case an entirely anhydrous oxid of magnesium is not required to be used with magnesium sulfate.

As an example of manufacture I may employ from 66 to 77% by weight of calcined magnesite, from 33 to 22% of partially dried dehydrated sulfate of magnesium and about 1% of chlorid of magnesium, but I have obtained specially good results by using a mixture containing about 10 parts of anhydrous sulfate and about 90 parts of calcined magnesite. I find that this composition in all forms does not decompose readily, and can be kept for a long time and transported conveniently in a substantially dry state, in an ordinary receptacle, such as physicians use. It is not necessary to mix the materials on the spot, but the composition may be carried around already mixed up ready for application. It is applied in a very simple way.

The bandage may be moistened in water and applied as usual and the composition may be sprinkled on the moistened bandage, while it is being applied. In this case there will be practically no loss of sulfate by dissolving and the final splint will not only be stronger and harder, but also cheaper, because less material will be required. If desired, however, the bandage may be prepared by spreading the mixture on it or impregnating it with the mixture. It may then be rolled up and when used may be placed in a small quantity of water for a very short time until saturated, and the excess of water squeezed out. In either case two layers may be applied over sheet wadding, and enough powder rubbed on to dry up any excess of moisture. For temporary support this splint is covered with thin muslin and two layers of light quick setting plaster of Paris applied. The plaster of Paris and muslin bandages should be removed next day. Such a dressing is exceedingly light in weight, is comfortable, tenacious, elastic and strong, and resists moisture, and in applying it, nothing is required except the dry composition, the bandages, and a little water. It also sets rather quickly when made, as above stated, of magnesium sulfate.

If the plaster of Paris cast is used, the examination is made through the magnesite composition splint or bandage which is left when the plaster of Paris is removed. In this way it will be seen that means is provided whereby the parts are kept firmly in position during the examination in the absence of the plaster cast. The layer or bandage A being applied first and covered with the muslin before the plaster is applied, it is found that the plaster readily separates from it when it is desired to remove it. It will be understood, of course, that the entire cast may be made of this composition without the use of the plaster at all, but when it is used, the quick setting plaster holds the magnesite composition in position during the superficial setting of the latter, which is slower.

It is to be understood, that while I refer to the composition as sold on the market and carried around by the surgeon as a dried mixture, I mean by that a partially or wholly dried mixture such as can be transported without the use of liquids to keep it in a plastic or liquid state. It may be wholly or partially dry. The two principal ingredients may be carried in separate packages also, in which case the sulfate of magnesium is wholly or partially dried or crystallized as before stated.

One of the difficulties met with in making bandages and splints in the above described manner is due to the fact that the so-called magnesite compositions set rather slowly even when the sulfate is used.

One of the most important reasons for adopting plaster of Paris for splints and casts in the medical profession is the rapid superficial setting of the plaster. Now in order to secure the advantages of the above mentioned composition for splints and bandages and at the same time to increase its setting qualities, I have found that a certain amount of plaster of Paris may be added to the "magnesite" composition. It will be understood of course that this reduces the penetrability of the splint to X-rays but as the plaster of Paris is not entirely impenetrable and as the "magnesite" composition is so strong that only a thin coating or mass of material is necessary, I find that a material quantity of plaster of Paris may be added without decreasing the penetrability enough to do any great harm for ordinary cases.

As an example of manufacture of this form of the invention, I make a mixture of about 25% by weight of plaster of Paris, 5 to 10% of anhydrous sulfate of magnesium, with a small amount of chlorid, or of chlorid of magnesium with a small amount of sulfate of magnesium, and 65 to 70% of calcined magnesite, and prepare it as above described. When spread upon a bandage moistened with water and applied as a splint on a fracture, the composition sets much more quickly than a pure "magnesite" splint and yet is still sufficiently penetrable by the X-rays to permit accurate observations without removing any part of the splint.

On account of the composition of the material, the splint need be only of a very small thickness and consequently its penetrability is reduced. It will be obvious, therefore, that it is much more penetrable than a pure plaster of Paris splint which would have to be considerably thicker in order to accomplish the same results as far as its use on the limb or the like is concerned. The amount of plaster of Paris may be increased still further and yet the splint will be sufficiently penetrable by the X-rays for ordinary purposes, provided its thickness and weight is kept down by the use of the "magnesite" composition. The composition when containing the plaster of Paris is much more practical for a surgeon, because he does not always have time to apply two splints, one on top of the other, and because he will not like the idea of the loss of time necessary in removing one splint and leaving the other, which in some cases will be painful or otherwise disagreeable to the patient if not done with the greatest of care.

All materials should be anhydrous if the splint mixture is kept ready mixed to spread on bandages to be dipped in water before application. Instead of having all the ingredients in a ready mixed state, it is possible to keep a mixture of plaster of Paris and calcined magnesite in proper proportions so as to be ready to mix with the sulfate of magnesium or chlorid of magnesium or a mixture of both. I have found also that good results are obtained if a splint or bandage is applied as described in the first part of this specification not containing the plaster of Paris as an ingredient and its surface rubbed all over with dry plaster of Paris while the magnesite splint is wet after its application to the limb. A splint thus prepared gets hard on the outside surface very quickly and is found to be sufficiently penetrable by X-rays to permit accurate observations because there is only a very thin coating of plaster of Paris.

The composition of calcined magnesite and the soluble magnesium salt (sulfate, or chlorid, or both) with plaster of Paris mixed therewith or applied to its surface and containing other ingredients is also useful as a cement and for various other purposes. I find also that, as might be supposed from what has been said about it, plaster of Paris can be used as a means for regulating the setting of the magnesite splint, as described in the first part of this specification. The greater the amount of plaster of Paris present, the greater the rapidity of the hardening or at least superficial hardening of the mixture. The invention also may be carried out by first covering the bandages with calcined magnesite or oxid of magnesium and then dipping them into liquid chlorid of magnesium containing some sulfate of magnesium for the purpose of binding the hydrated oxid contained eventually in the calcined magnesite used. This forms a slow-setting coating which hardens after the plaster of Paris is applied, and has substantially the same results but it is not as convenient in use, as it is necessary to carry around a dry substance and a liquid one to be used when the bandage is applied. The liquid used should be of a certain strength, preferably from 25 to 28 degrees Baumé. The dry anhydrous chlorid may be used also in place of the sulfate.

While I have mentioned a particular form of bandage, and described certain preferred proportions of the ingredients, I am aware that many modifications may be made therein, and the invention may be carried out in other ways without departing from the scope of the invention as expressed in the claims. Therefore I do not wish to be limited to all the details stated but What I do claim is:—

1. A composition of matter for surgical bandages comprising a dry mixture of sulfate of magnesium, chlorid of magnesium, and from 65% to 70% by weight of oxid of magnesium.

2. A composition of matter for surgical bandages or splints comprising a dry mixture of about 25% of plaster of Paris, less than 10% anhydrous sulfate of magnesium, a small percentage of chlorid of magnesium, and about 65% of calcined magnesite.

In testimony whereof I have hereunto set my hand, in the presence of two subscribing witnesses.

LUDWIG H. REUTER.

Witnesses:
W. S. WOOD,
N. E. MUNN.